United States Patent [19]

Pace

[11] Patent Number: 5,383,777
[45] Date of Patent: Jan. 24, 1995

[54] POWERED CLAMP FOR MOUNTING MOLD PARTS TO MOLDING MACHINE

[76] Inventor: Paul G. Pace, 19368 Crystal Ridge La., Northridge, Calif. 91326

[21] Appl. No.: 28,793

[22] Filed: Mar. 9, 1993

[51] Int. Cl.⁶ ............................................. B29C 33/30
[52] U.S. Cl. .................................. 425/192 R; 425/195
[58] Field of Search ..................... 425/192 R, 195, 182

[56] References Cited

U.S. PATENT DOCUMENTS

| | | | |
|---|---|---|---|
| 4,472,128 | 9/1984 | Ruhl | 425/192 R |
| 4,568,263 | 2/1986 | Ruhl | 425/192 R |
| 4,743,192 | 5/1988 | Higuchi | 425/192 R |
| 5,096,405 | 3/1992 | Pace et al. | 425/192 R |
| 5,118,269 | 6/1992 | Klose et al. | 425/195 |

*Primary Examiner*—James Mackey
*Attorney, Agent, or Firm*—Donald D. Mon

[57] ABSTRACT

A powered clamp for holding mold parts to a platen. The platen has a surface with a mounting slot. The clamp includes a base plate to bear against the platen surface. A pivot bolt with a T-head fits in the slot and is held against tilting relative to the base plate. A pivot nut is threaded to the pivot bolt. A clamping bar passes the pivot bolt. The pivot bolt and clamping bar carry bearing surfaces that enable the clamping bar to tilt relative to the pivot bolt. A bias spring bases the bearing surfaces together. A hydraulic piston-cylinder assembly is mounted to the clamping bar, with a piston rod that extends toward the base plate, and has an external thread. A lock ring is threaded to the piston rod to lock the piston rod against retraction while it is in its extended position.

9 Claims, 2 Drawing Sheets 5,383,777

POWERED CLAMP FOR MOUNTING MOLD PARTS TO MOLDING MACHINE

FIELD OF THE INVENTION

This invention relates to the mounting of mold parts to the platens of molding machines.

BACKGROUND OF THE INVENTION

A molding machine supports the parts of a separable mold on the faces of its platens. The platens are powered to move the mold parts toward and away from one another to close the mold and to open it. When closed, plastic is injected into the mold cavities to form a product. The product is removed when the platens pull the mold parts away from one another.

When different products are to be run from time to time on molding machine, the mold parts must be changed. In such circumstances, one mold set will be removed and another will be put in place on the platens. Often these molds are of different sizes.

In whatever event, these heavy mold parts must be mounted to the platens and located very precisely relative to one another The manipulation into place, and the bolting down of the mold parts is inconvenient, troublesome and time-consuming.

It is an object of this invention to enable the use of non-uniform mounting means conveniently sized to the respective mold part, and which can readily be mounted to a universally adaptable mounting plate by powered clamps, quickly and easily.

There have been previous devices proposed for this purpose, among them being Pace U.S. Pat. No. 5,096,405, issued Mar. 17, 1992, which is incorporated herein by reference in its entirety for its showing of such clamps. Its objective is to allow placement of a hydraulically-powered clamp on a mold machine platen, where it will serve to hold a mold machine part at an adjusted location. The instant invention is intended to do the same, except it does so in an improved form which is easier to be locked and kept locked in a selected position.

BRIEF DESCRIPTION OF THE INVENTION

A powered clamp according to this invention includes a base plate intended to bear against the surface of a platen, which platen has a slot therein. The term "platen" includes a plate mounted to the machine's own platen, and is in effect an extension of the platen itself. For convenience in disclosure, the surface of this plate is referred to as the surface of the platen. A pivot bolt has a head and a shank. The shank fits closely and slidably in an aperture in the base plate, and the head is enlarged so that when the shank fits in the slot, the head overhangs the edges of the slot and retains the pivot bolt to the platen. The shank includes an external thread spaced above the base plate.

A pivot nut is threaded to the shank, and has a convex bearing face facing toward the head of the pivot bolt. A clamping bar has a passage through which the shank of the pivot bolt passes with a clearance which will permit the clamping bar to rock. A countersink is formed in the clamping bar facing the bearing seat. A pivot washer with a bearing face is fitted in the countersink with the bearing seats in contact with one another. A compression spring is placed in the countersink biasing the pivot washer toward the bearing face on the pivot nut. The dimensions ate such that the pivot nut is biased away from the clamping bat, and the clamping bar is biased toward the base.

The clamping bat has a flange adapted to overhang a surface on a mold part to press the mold part toward and against the platen. On the other side of the pivot bolt from the flange, a hydraulic piston-cylinder assembly is mounted to the clamping bar. A hydraulic cylinder is mounted to the clamping bar, and its piston plunger extends from the clamping bar to bear against the base plate. When a mold part is to be clamped in place, extension of the piston plunger raises the clamping bar to press the bearing faces against one another, compressing the spring as it does so. This rocks the clamping bar to hold the mold part in place.

According to a feature of this invention, the piston plunger is threaded below the clamping bar, and a lock ring is threaded to it. When tightened down against the clamping bar, it will prevent retraction of the piston, and hold the clamp against loosening when the hydraulic pressure is released. Thus, one hydraulic source can be used for a plurality of clamps.

According to an optional feature of the invention, the spring is a Belleville washer, which over a small excursion can store considerable energy. Thus, if when the hydraulic force is relieved, the material of the clamp relaxes somewhat to cause a springback, the spring changes the action of the clamping bar from that of a first degree lever to that of a T clamp and reliably holds the mold part in place.

The above and other features of the invention will be fully understood from the following detailed description and the accompanying drawings, in which:

DETAILED DESCRIPTION OF THE INVENTION

Figure 1:
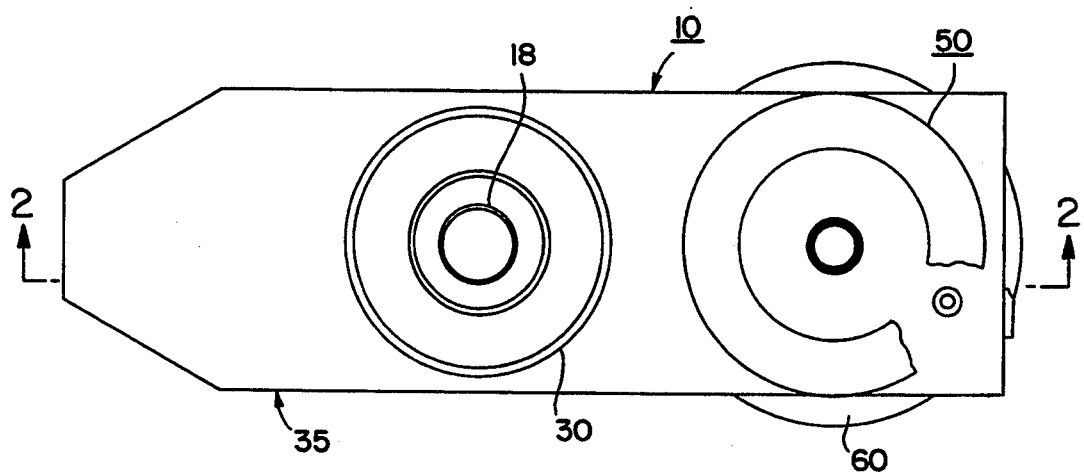
FIG. 1 is a top view of the presently-preferred embodiment of the invention.

Power clamp 10 has as its objective to bear against a surface 11 of a plate 11a mounted to a machine platen 12 by attachment means (not shown). A slot 13 is formed in the plate, along which the clamp can adjustably be attached along the slot. A base plate 14 has a surface 15 that bears against surface 11 for this purpose. It spans the slot.

In conventional practice, what is referred to as the platen is a permanent part of the machine. It is not usually slotted. Instead it is provided with mounting means, and a slotted plate such as plate 11a is attached to it. For convenience in disclosure, surface 11 is referred to as the surface of the platen, and the plate as part of the platen because in use it is an extension of the platen itself.

An aperture 16 (FIG. 2) in the base plate passes the shank 17 of a pivot bolt 18. Bolt 18 carries an external thread 19. A head 20 is formed on the pivot bolt by a shouldered T nut 21. It is cemented in place and held against rotation relative to the bolt by adhesive means such as LOCTITE. The shoulder 22 of the T nut is brought to bear against the back side of the platen, on each side of the slot, to hold the clamp in place. Nut 21 is threaded onto the pivot bolt. A sleeve 23 with an unthreaded cylindrical inner wall is welded into aperture 16. The pivot bolt makes a close, sliding fit in the sleeve. The sleeve keeps the pivot bolt from tipping and enables the pivot bolt to move to accommodate different slot dimensions. The pivot bolt functions as a T bolt, and is inserted into the slot from an open end or through a keyhole.

A pivot nut 30 is threaded onto the pivot bolt. It includes a bearing face 31, preferably spherical, which faces toward the headed end of the pivot bolt.

A clamping bar 35 is a strong metal body with a flange 36 that is intended to overhang a shoulder 37 on a mold part 38 to hold the mold part to the platen.

A countersink 40 is formed at the upper end of a passage 41 through the clamping bar, which passes the pivot bolt with a substantial side clearance so the bar can rock relative to the pivot bolt.

A bearing insert 45 fits closely in the countersink, and can shift axially in it. It has a bearing surface 46 in its upper surface which matches bearing seat 31 on the pivot nut.

A bias spring 47, preferably a Belleville washer, fits in the countersink and biases the bearing insert toward and against the bearing nut.

A hydraulic piston-cylinder assembly 50 is mounted to the clamping bar on the other side pivot bolt from flange 36. Assembly 50 comprises a cylinder housing 51 which is bolted to the clamping bar. An internal cylinder 52 slidably receives a piston 53 which is slidably sealed by rings 54. A piston rod 55 depends from the piston, passes through the clamping bar, and bears against the mounting plate.

A return bias spring 56 biases the piston upwardly.

The lower end of the piston rod bears an external thread 58 to which an internally threaded lock ring 60 is mounted. It has a surface 61 adapted to bear against surface 62 on the clamping bar when the piston is to be locked against retraction.

Hydraulic connection 63, 64 and channels (not shown) are provided to conduct hydraulic fluid into the cylinder above the piston.

A second bias spring 65 is provided inside a tubular plunger 66 to bias the shouldered-end of the clamping bar away from the base plate.

A roll pin 67 is fitted in a sink 68 in the base plate, and in a slot in the clamping bar, to restrain the clamping bar from rotation relative to the base plate around the pivot bolt so as to keep the clamping bar aligned with the base plate. It is shown only in FIG. 2.

Another roll pin 69 is fitted in a hole in the T nut to fit in the slot in the platen and prevent the T nut from rotating relative to the platen, and thence also relative to the base plate and to the pivot bolt.

The operation of this clamp is straightforward. The mold part is positioned relative to the platen, and the clamp, with the head of the pivot bolt in the slot of the platen, is moved toward and against the mold part, with its flange overhanging the surface on the mold part. Hydraulic pressure will have been relieved and the lock nut backed off so the piston can return along with the plunger.

Figure 2:
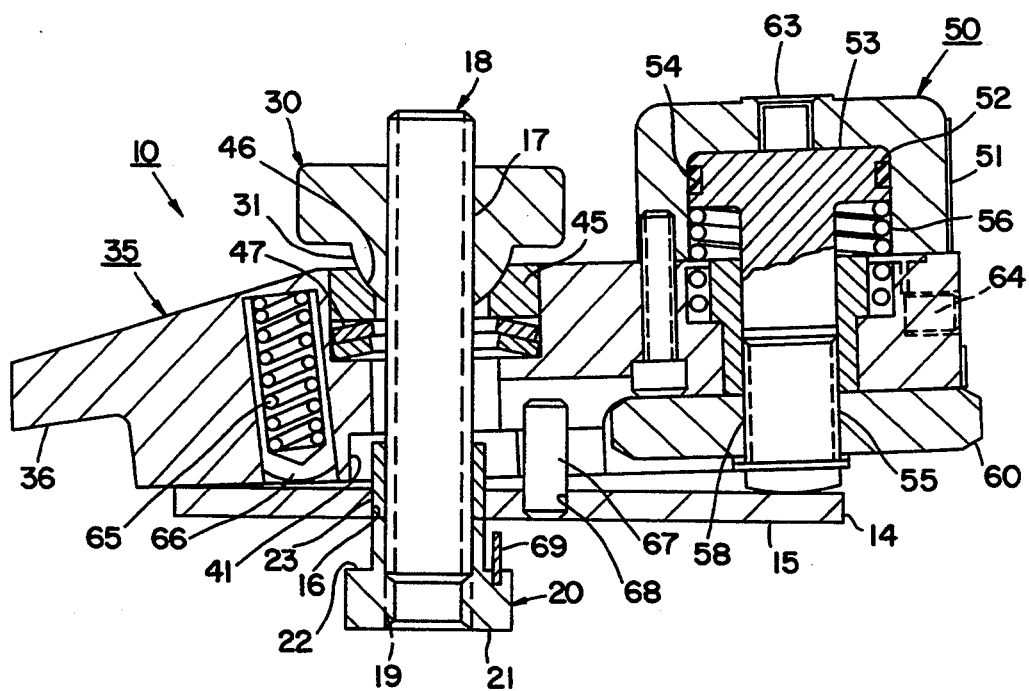
FIG. 2 is a cross-section taken at line 2—2 in FIG. 1.

Pivot nut 30 is backed off sufficiently so that the clamping bar can be tilted as shown in FIG. 2 sufficiently to clear the mold edge. The pivot nut is suitably adjusted, and spring 47 is not significantly compressed, if it is compressed at all. Now the clamping bar is ready to act as a first degree lever, rotating around the center of the bearing faces.

Hydraulic pressure is exerted in the cylinder, and its end of the clamping bar rises as the other end lowers until it contacts the mold part. Then continuing extension of the plunger converts the action of the clamping bar to that of a second degree lever, pivoting around flange 36. This compresses spring 47. Compression of the spring continues until the spring is fully compressed against the bearing washer, or until the effect of the hydraulic pressure is balanced by the opposing spring force. In either event, the bearing faces bear against each other and enable the clamping bar to tilt as necessary.

When the clamp is fully applied, and while the hydraulic pressure is still exerted, the lock ring is tightened down. This will prevent retraction of the plunger, and the hydraulic pressure can be relieved and the hydraulic source disconnected.

In the event of any relaxation in the clamp structure as the consequence of release of the pressure, spring 47 will act as a bias force, pressing the clamping bar as a T-bar against both the plunger and against the mold part, reliably to hold it in place. The pitch of the thread for the pivot nut is such that it is a locking thread which will not loosen as the consequence of an axial force.

Figure 3:
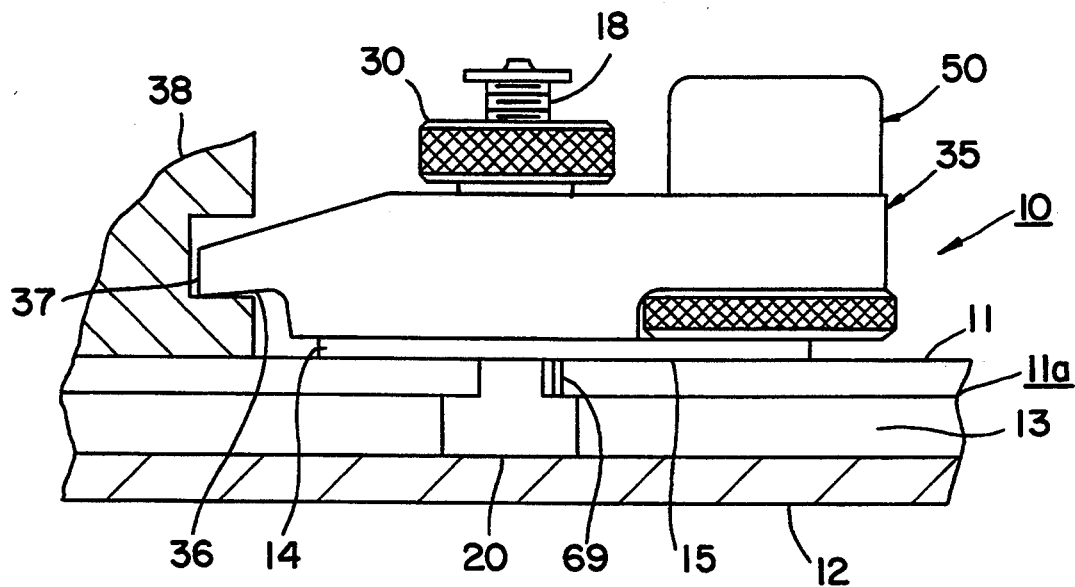
FIG. 3 is a side view showing the clamp in its minimum grip condition.
Figure 4:
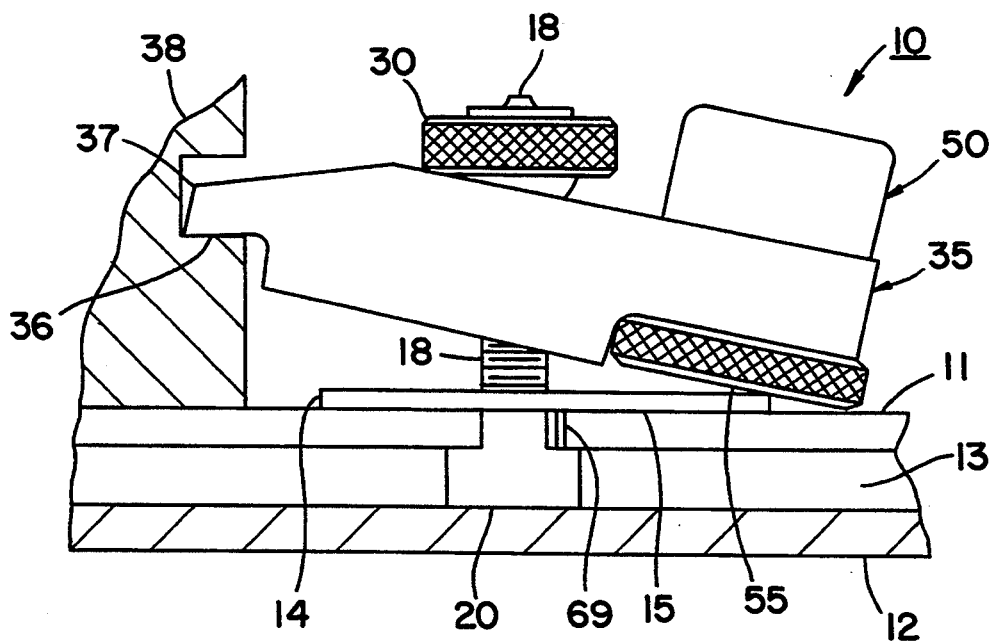
FIG. 4 is a side view showing the clamp in its maximum grip condition.

FIGS. 3 and 4 show the minimum and maximum grip conditions of the clamp. Intermediate grips will be attained by a suitable adjustment of the pivot nut along the pivot bolt, and the resulting different extensions of the plunger.

This clamp thereby provides a convenient and reliable means for mounting mold parts, which is very versatile in its usefulness.

This invention is not to be limited by the embodiment shown in the drawings and described in the description, which is given by way of example and not of limitation, but only in accordance with the scope of the appended claims.

I claim:

1. A clamp for holding mold parts to a platen, said platen having a surface and a mounting slot in said surface, said clamp comprising:

a base plate having a surface for bearing against said platen surface, and an aperture through said base plate;

a pivot bolt having a T-head for fitting in said slot, and an external thread, said pivot bolt including a shank slidably fitted in the aperture in said base plate;

a pivot nut threadedly mounted to the thread on the pivot bolt, and a bearing face on said pivot nut;

a clamping bar having a passage therethrough, through which the pivot bolt extends, a countersink in said passage, a bearing washer having a bearing face complementary to the bearing face on the pivot nut, said bearing washer being axially shiftable in said countersink, bias spring means seated in said countersink biasing said bearing washer against the pivot nut, and a clamping flange on said clamping bar;

a hydraulic piston-cylinder assembly mounted to said clamping bar on the other side of said pivot bolt from said clamping flange, said assembly comprising a hydraulic cylinder mounted to said clamping bar, a piston in said cylinder, and a piston rod extending from said piston towards said base plate, and an external thread on said piston rod; and a lock ring threaded to said piston rod adapted to bear against the clamping bar to lock the piston rod against retraction while in an extended position, thereby to hold the clamp against release after hydraulic pressure is relieved in said cylinder.

2. A clamp according to claim 1 in which said bias spring means is a Belleville washer.

3. A clamp according to claim 1 in which a retraction plunger is seated in the clamping bar between the clamping flange and the pivot bolt to bias the clamping bar toward an open position.

4. A clamp according to claim I in which said T-head is formed by a T nut threaded to said pivot bolt, and in which a stud is fitted to the T nut to engage in the slot and restrict rotation of the T nut relative to said mounting slot.

5. A clamp according to claim 1 in which a sleeve having an internal smooth walled cylindrical passage is fixed to said base plate at said apertures in which said pivot bolt is slidably fitted and by which sleeve said pivot bolt; restrained against tilting relative to the base plate.

6. A clamp according to claim 1 in which a retraction plunger is seated in the clamping bar between the clamping flange and the pivot bolt to bias the clamping bar toward an open position and in which said bias spring means is a Belleville washer.

7. A clamp according to claim 1 in which said T-head is formed by a T nut threaded to said pivot bolt, and in which a stud is fitted to the T nut to engage in the slot and restrict rotation of the T nut relative to the slot and in which said bias spring means is a Belleville washer.

8. A clamp according to claim 1 in which a sleeve having an internal smooth walled cylindrical passage is fixed to said base plate at said aperture in which said pivot bolt is slidably fitted and by which sleeve, said pivot bolt restrained against tilting relative to the base plate, and in which said bias spring means is a Belleville washer.

9. A clamp for holding mold parts to a platen, said platen having a surface and a mounting slot in said surface, said clamp comprising:

a base plate having a surface for bearing against said platen surface, and an aperture through said base plate;

a threaded pivot bolt, a T-head comprising a T nut threaded to an external thread on said pivot bolt for fitting in said slot, said pivot bolt including a shank slidably fitted in the aperture in said base plate and a stud fitted to said T nut to engage in said slot to restrict rotation of the T nut relative to the slot.

a pivot nut threadedly mounted to said external thread on the pivot bolt, and a bearing face on said pivot nut;

a clamping bar having a passage therethrough, through which the pivot bolt extends, a countersink in said passage, a bearing washer having a bearing face complementary to the bearing face on the pivot nut, said bearing washer being axially shiftable in said countersink, a Belleville washer seated in said countersink biasing said bearing washer against the pivot nut, and a clamping flange on said clamping bar;

a retraction plunger seated in the clamping bar between the clamping flange and the pivot bolt to bias the clamping bar toward an open position;

a hydraulic piston-cylinder assembly mounted to said clamping bar on the other side of said pivot bolt from said clamping flange, said assembly comprising a hydraulic cylinder mounted to said clamping bar, a piston in said cylinder, and a piston rod extending from said piston towards said base plate, and an external thread on said piston rod;

a sleeve having an internal smooth walled cylindrical passage fixed to said base plate at said aperture in which said pivot bolt to slidably fitted and by which sleeve said pivot bolt is restrained against tilting relative to the base plate; and a lock ring threaded to said piston rod adapted to bear against the clamping bar to lock the piston rod against retraction while in an extended position, thereby to hold the clamp against release after hydraulic pressure is relieved in said cylinder.

* * * * *